US011902758B2

(12) United States Patent
Olsson

(10) Patent No.: US 11,902,758 B2
(45) Date of Patent: Feb. 13, 2024

(54) METHOD OF COMPENSATING A PROCESSED AUDIO SIGNAL

(71) Applicant: GN Audio A/S, Ballerup (DK)

(72) Inventor: Rasmus Kongsgaard Olsson, Ballerup (DK)

(73) Assignee: GN Audio A/S, Ballerup (DK)

( * ) Notice: Subject to any disclaimer, the term of this patent is extended or adjusted under 35 U.S.C. 154(b) by 326 days.

(21) Appl. No.: 16/718,651

(22) Filed: Dec. 18, 2019

(65) Prior Publication Data

US 2020/0204915 A1 Jun. 25, 2020

(30) Foreign Application Priority Data

Dec. 21, 2018 (EP) .................................... 18215682

(51) Int. Cl.
*H04R 3/04* (2006.01)
*G10L 25/18* (2013.01)
(Continued)

(52) U.S. Cl.
CPC ................ *H04R 3/04* (2013.01); *G10L 25/18* (2013.01); *H04R 1/406* (2013.01); *H04R 3/005* (2013.01)

(58) Field of Classification Search
CPC .......... H04R 3/005; H04R 3/04; H04R 1/406; G10L 25/18
See application file for complete search history.

(56) References Cited

U.S. PATENT DOCUMENTS 9,076,456 B1 7/2015 Avendano et al.
9,241,228 B2 1/2016 Ng
(Continued)

FOREIGN PATENT DOCUMENTS

EP 2738762 6/2014

OTHER PUBLICATIONS

Microphone Array Post-Filter Based on Noise Field Coherence, by Iain A. McCowan, IEEE Transactions on Speech and Audio Processing, vol. 11, No. 6, Nov. 2003, pp. 709-716.
(Continued)

*Primary Examiner* — Daniel R Sellers
(74) *Attorney, Agent, or Firm* — HAMRE, SCHUMANN, MUELLER & LARSON, P.C.

(57) ABSTRACT

A method comprising: at an electronic device (100) having an array microphones (101) with a plurality of microphones and a processor (102): receiving a plurality of microphone signals (x1, x2, x3) from the plurality of microphones; generating a processed signal (XP) from the plurality of microphone signals using one or both of beamforming and deconvolution; generating a compensated processed signal (XO) by compensating the processed audio signal (XP) in accordance with compensation coefficients (Z). Generating the compensated processed signal comprises: generating first spectrum values (PXP) from the processed audio signal; generating reference spectrum values (<PX>) from multiple second spectrum values (PX1, PX2, PX3) generated from each of at least two of the microphone signals in the plurality of microphone signals (x1, x2, x3); and generating the compensation coefficients (Z) from the reference spectrum values (<PX>) and the first spectrum values (PXP).

The compensation may improve undesired effects related to e.g. coloration at the output of multi-microphone systems involving e.g. one or both of beamforming and deconvolution of microphone signals from a microphone array.

17 Claims, 6 Drawing Sheets

(51) Int. Cl.
*H04R 1/40* (2006.01)
*H04R 3/00* (2006.01)

(56) References Cited

U.S. PATENT DOCUMENTS

| | | | |
|---|---|---|---|
| 9,613,610 | B2 | 4/2017 | Park et al. |
| 9,641,935 | B1 * | 5/2017 | Ivanov .................. H03G 5/165 |
| 9,721,582 | B1 | 8/2017 | Huang et al. |
| 9,781,531 | B2 | 10/2017 | Sun et al. |
| 9,813,833 | B1 | 11/2017 | Vesa |
| 2009/0080666 | A1 | 3/2009 | Uhle et al. |
| 2010/0296668 | A1 * | 11/2010 | Lee ................. G10K 11/17854 381/94.7 |
| 2012/0263317 | A1 * | 10/2012 | Shin .................... G10L 21/0224 381/94.7 |
| 2013/0170666 | A1 | 7/2013 | Ng |
| 2015/0278686 | A1 | 10/2015 | Cardinaux et al. |
| 2016/0284346 | A1 | 9/2016 | Visser et al. |
| 2017/0365255 | A1 * | 12/2017 | Kupryjanow ........... G10L 15/20 |
| 2018/0270565 | A1 * | 9/2018 | Ganeshkumar ......... G10L 25/84 |
| 2019/0219659 | A1 * | 7/2019 | Sugiyama ............... G01S 3/808 |

OTHER PUBLICATIONS

Extended European search report for European patent application No. 18215682.8 dated Jul. 12, 2019.

Pan Chao et al: "On the noise reduction performance of the MVDR beamformer in noisy and reverberant environments", 2014 IEEE International Conference On Acoustics, Speech and Signal Processing (ICASSP), IEEE, May 4, 2014, pp. 815-819, XP032618230.

* cited by examiner

METHOD OF COMPENSATING A PROCESSED AUDIO SIGNAL

Some electronic devices, such as speakerphones, headsets, and hearing instruments and other types of electronic devices, are configured with an array of microphones and a processor configured to receive a plurality of microphone signals from the array of microphones and to generate a processed signal from the plurality of microphone signals, e.g. using multi-microphone algorithms such as beamforming and deconvolution techniques, as it is known in the art of audio signal processing. The processed signal may be a single channel processed signal or a multi-channel signal e.g. a stereo signal.

A general advantage of generating a processed signal from the plurality of microphone signals from microphones in a microphone array is that, sound quality, including intelligibility, can be improved over sound quality from say single microphone systems. In this respect an acoustic signal from a source, e.g. from a speaking person, may be denoted a signal of interest, whereas acoustic signals from other sources may be denoted noise e.g. background noise.

In particular, multi-microphone algorithms such as beamforming and deconvolution techniques are able at least in some situations to reduce the acoustic influence, e.g. in the form of so-called early reflections arriving within say 40 milliseconds from a direct signal, from a surrounding room—also known as coloration. The most significant effect of multi-microphone algorithms which include deconvolution and beamforming methods is that they partially cancel reverberation and ambient noise, respectively. In general, beamforming may be used to obtain a spatial focus or directionality.

However, such multi-microphone algorithms may come with a problem of so-called target-signal cancellation, where a part of a target voice signal (which is a desired signal) is at least partially cancelled by the multi-microphone algorithm. Thus, as a result, a net and unfortunate effect of using such a multi-microphone algorithm may be that coloration of the desired signal increases at least in some situations due to the multi-microphone algorithm itself.

In connection therewith, the term coloration of the audio signal or simply coloration relates to a change in the distribution of the tonal spectrum as measured or perceived by a person. As mentioned above, coloration may relate e.g. to the acoustic influence by the room in which the microphone picks up an acoustic signal from a sound source such as a person speaking. Generally, the presence of walls, windows, tables—persons—and other things plays a role in coloration. Larger amounts of coloration may be perceived as harsh or washy quality and may significantly degrade speech intelligibility.

Herein, when beamforming and deconvolution is mentioned it may relate to frequency domain and/or time domain embodiments.

RELATED PRIOR ART

U.S. Pat. No. 9,721,582 B1 discloses fixed beamforming with post-filtering which suppresses white noise, diffuse noise, and noise from point interferers. The disclosed post-filtering is based on Discrete Time Fourier transform on multiple microphone signals before being input to a fixed beamformer. A single channel beamformed output signal from the fixed beamformer is filtered by the post-filter, before Inverse Discrete Time Fourier transform is performed. Post-filter coefficients, to reduce noise filtering by the post-filter, is calculated based on fixed beamformer coefficients of the fixed beamformer and on an estimate of the power of the microphone signals, which in turn is based on a calculated covariance matrix.

U.S. Pat. No. 9,241,228 B2 discloses self-calibration of a directional microphone array. In one embodiment, a method for adaptive self-calibration comprises matching an approximation of an acoustic response calculated from a plurality of responses from microphones in the array to an actual acoustic response measured by a reference microphone in the array.

In another embodiment, a method for self-calibrating directional microphone arrays comprises a low-complexity frequency-domain calibration procedure. According to this method, magnitude response matching is carried out for each microphone with respect to an average magnitude response of all the microphones in the array. An equalizer receives a plurality of spectral signals from a plurality microphones and calculates power spectral density (PSD). Further, an average PSD value is determined based on the PSD values for each microphone for determining equalization gain value. One application is in hearing aids or small audio devices and used to mitigate adverse aging and mechanical effects on acoustic performance of small-microphone arrays in these systems. It is appreciated that sound recorded with a directional microphone array having poorly matched responses would yield, upon playback, an audio sound field for which it would be difficult to discern any directionality to the reproduced sounds.

U.S. Pat. No. 9,813,833 B1 discloses a method for output signal equalization among microphones. Multiple microphones may be utilized to capture the audio signals. A first microphone may be placed near a respective sound source and a second microphone may be located a greater distance from the sound source so as to capture the ambience of the space along with the audio signals emitted by the sound source(s). The first microphone may be a Lavalier microphone placed on the sleeve or lapel of the person. Following capture of the audio signals by the first and second microphones, the output signals of the first and second microphones are mixed. In the mixing of the output signals of the first and second microphones, the output signals of the first and second microphones may be processed so as to more closely match the long term spectrum of the audio signals captured by the first microphone with the audio signals captured by the second microphone. The signals received from a first and a second microphone are fed into a processor for estimating an average frequency response. After estimating an average frequency response the quality signals are then utilized for purpose of equalizing long term average spectra of the first and second microphones. The method also determines a difference between the frequency response of the signals captured by the first and second microphones and processes the signals captured by the first microphone for filtering relative to the signals captured by the second microphone based upon the difference Thus, despite providing compensation to individual microphones which may be advantageous in connection with a directional microphone array, unrecognized problems related to beamformers and other types of multi-microphone enhancement algorithms and systems remain to be solved to improve quality of sound reproduction involving a microphone array.

SUMMARY

It is observed that problems related to undesired coloration of an audio signal may occur when generating, e.g.

using beamforming, deconvolution or other microphone enhancement methods, a processed signal from a plurality of microphone signals, which may be output by an array of microphones. It is observed that undesired coloration additionally or alternatively may be due to the acoustic properties of the surrounding room, including its equipment and other things present in the surrounding room, in which the microphone array is placed. The latter is also known as a room coloration effect.

There is provided a method comprising:

at an electronic device having an array of microphones and a processor:
- receiving a plurality of microphone signals from the array of microphones;
- generating a processed signal from the plurality of microphone signals;
- generating a compensated processed signal by compensating the processed audio signal in accordance with a plurality of compensation coefficients, comprising:
- generating first spectrum values from the processed audio signal;
- generating reference spectrum values from multiple second spectrum values which are generated from each of at least two of the microphone signals in the plurality of microphone signals; and
- generating the plurality of compensation coefficients from the reference spectrum values and the first spectrum values.

The problem of undesired coloration may be at least partially remedied by compensation as defined in the claimed method and electronic device as set out herein. The compensation may improve undesired, but not always recognized, effects related to e.g. coloration at the output of multi-microphone systems involving e.g. one or both of beamforming and deconvolution of microphone signals from a microphone array.

It is possible, at least at some frequencies, to compensate the processed audio signal in accordance with a reference spectrum which is generated from the microphone signals while the electronic device is in use to reproduce an acoustic signal, picked up by at least some of the microphones in the array of microphones.

Thus, despite undesired coloration being introduced into the processed audio signal while generating the processed audio signal, the reference spectrum values are provided in a way which bypasses the generation of the processed audio signal. The reference spectrum values are thus useful for compensation for the undesired coloration. The reference spectrum values may be provided in a feed forward loop in parallel with or concurrently with the generating a processed signal from the plurality of microphone signals.

In an electronic device such as a speakerphone, a headset, a hearing instrument, speech controlled devices etc. microphones are arranged relatively closely e.g. within a mutual distance of a few millimetres to less than 25 cm e.g. less than 4 cm. At some lower frequencies, intra-microphone coherence is very high i.e. the microphone signals are very similar in magnitude and phase and the compensation for the undesired coloration tend to be less effective at these lower frequencies. At some higher frequencies, the compensation for the undesired coloration tend to be more effective. At which frequencies the lower frequencies and higher frequencies are depends inter alia on the spatial distance between the microphones.

In some aspects the multiple second spectrum values are generated from each of the microphone signals in the plurality of microphone signals. In some aspects the multiple second spectrum values are generated from each, but some predefined number, of the microphone signals in the plurality of microphone signals. For instance, if the microphone array has eight microphones, the multiple second spectrum values may be generated from the microphone signals from six of the microphones, while not being generated from the microphone signals from two of the microphones. It may be fixed from which microphones (signals) to generate the multiple second spectrum values or it may be determined dynamically e.g. in response to evaluation of each or some of the microphone signals.

The microphone signals may be digital microphone signals output by so-called digital microphones comprising an analogue-to-digital converter. The microphone signals may be transmitted on a serial multi-channel audio bus. In some aspects, the microphone signals may be transformed by a Discrete Time Fast Fourier Transform, FFT, or another type of time-domain to frequency-domain transformation, to provide the microphone signals in a frequency domain representation. The compensated processed signal may be transformed by an Inverse Discrete Time Fast Fourier Transform, IFFT, or another type of frequency-domain to time-domain transformation, to provide the compensated processed signal in a time domain representation. In other aspects, processing is performed in the time-domain and the processed signal is transformed by a Discrete Time Fast Fourier Transform, FFT, or another type of frequency-domain to time-domain transformation, to provide the processed signal(s) in a frequency domain representation.

The generating a processed signal from the plurality of microphone signals may comprise one or both of beamforming and deconvolution. In some aspects, the plurality of microphone signals includes a first plurality (N) of microphone signals and the processed signal includes a second plurality (M) of signals, wherein the first plurality is less than the first plurality ($M<N$), e.g. $N=2$ and $M=1$, or $N=3$ and $M=1$ or $N=4$ and $M=2$. The spectrum values may be represented in an array or matrix of bins. The bins may be so-called frequency bins. The spectrum values may be in accordance with a logarithmic scale e.g. a so-called Bark scale or another scale or in accordance with a linear scale.

In some embodiments generating a compensated processed audio signal by compensating the processed audio signal in accordance with compensation coefficients reduces a predefined difference measure between a predefined norm of spectrum values of the compensated processed audio signal and the reference spectrum values.

Thereby, and due to the compensation, the spectrum values of the compensated processed audio signal may be compensated to resemble the reference spectrum values which are obtained without being colorized by the generating a processed audio signal from the plurality of microphone signals using one or both of beamforming and deconvolution.

The difference measure may be an unsigned difference, a squared difference or another difference measure.

The effect of reducing a predefined difference measure between a predefined norm of spectrum values of the compensated processed audio signal and the reference spectrum values can be verified by comparing measurements with and without compensation.

In some embodiments the multiple second spectrum values are each represented in an array of values; and wherein the reference spectrum values are generated by computing an average or a median value across, respectively, at least two or at least three of the multiple second spectrum values.

Generating the reference spectrum values in this way takes advantage of the microphones being arranged at different spatial positions in the microphone array. At each of the different spatial positions, and thus at the microphones, sound waves from a sound emitting source, e.g. a speaking person, arrives differently and possibly influenced differently by constructive or destructive reflections of the sound waves. Thus, when the reference spectrum values are generated by computing an average or a median value across, respectively, at least two or at least three of the multiple second spectrum values it is observed that chances are good that effects of constructive and destructive reflections diminish in the computed average or median. The reference spectrum values therefore serve as a reliable reference for compensating the processed signal. It has been observed that computing an average or a median value across, respectively, at least two or at least three of the multiple second spectrum values reduces undesired coloration.

The average or a median value may be computed for all or a subset of the second spectrum values. The method may comprise computing the average or a median value for values in the array of values at or above a threshold frequency (e.g. above a threshold array element) and forgoing computing the average or a median value for values in the array of values below or at a threshold frequency. Array elements of the arrays are sometimes denoted frequency bins.

In general, herein, the microphone array may be a linear array with microphones arranged along a straight line or a curved array with microphones arranged along a curved line. The microphone array may be an oval or circular array. The microphones may be arranged substantially equidistantly or at any other distance. The microphones may be arranged in groups of two or more microphones. The microphones may be arranged in a substantially horizontal plane or at different vertical levels e.g. in a situation where the electronic device is placed normally or in normal use.

In some embodiments generating the compensated processed signal includes frequency response equalization of the processed signal.

The equalization compensates for coloration introduced by the generating the processed signal from the plurality of microphone signals. Equalization adjusts one or both of amplitude and phase balance between frequency bins or frequency bands within the processed signal. Equalization may be implemented in the frequency domain or in the time domain.

In the frequency-domain, the plurality of compensation coefficients may include a set of frequency specific gain values and/or phase values associated with a set of frequency bins, respectively. In some embodiments the method performs equalization at selected set of bins, and forgoes equalization at other bins.

In the time-domain, the plurality of compensation coefficients may include e.g. FIR or IIR filter coefficients on one or more linear filters.

Generally, equalization may be performed using linear filtering. An equalizer may be used to perform the equalization. Equalization may compensate for coloration to a certain degree. However, the equalization may not necessarily be configured to provide a "flat frequency response" of the combination of the processing associated with generating the processed signal and the compensated processed signal at all frequency bins. The term "EQ" is sometimes used to designate equalization.

In some embodiments generating the compensated processed signal includes noise reduction. The noise reduction serves to reduce noise, e.g. signals which are not detected as a voice activity signal. In the frequency domain, a voice activity detector may be used to detect time-frequency bins, which relate to voice activity and, hence, which (other) time-frequency bins are more likely noise. The noise reduction may be non-linear, whereas equalization may be linear.

In some aspects, the method comprises determining first coefficients for equalization and second coefficients for noise reduction. In some aspects the equalization is performed by a first filter and the noise reduction is performed by a second filter. The first filter and the second filter may be coupled in series.

In some aspects, the first coefficients and the second coefficients are combined, e.g. including multiplication, into the above-mentioned plurality of compensation coefficients. Thereby equalization and noise reduction may be performed by a single filer.

The noise reduction may be performed by means of a post-filter e.g. a Wiener post-filter, e.g. a so-called Zelinski post-filter or e.g. a post-filter as described in "Microphone Array Post-Filter Based on Noise Field Coherence", by Iain A. McCowan, IEEE Transactions on Speech and Audio Processing, vol. 11, no. 6, November 2003.

In some embodiments the generating a processed signal (XP) from the plurality of microphone signals includes one or more of: spatial filtering, beamforming, and deconvolution.

In some embodiments the first spectrum values and the reference spectrum values are computed for respective elements in an array of elements; and wherein the compensation coefficients are computed, per corresponding respective element, in accordance with a ratio between a value of the reference spectrum values and a value of the first spectrum values.

In some aspects the first spectrum values, the reference spectrum values and the compensation coefficients are magnitude values e.g. obtained as the modulus of a complex number. The elements may also be denoted bins or frequency bins. In this way computations are efficient for a frequency domain representation.

In some aspects the reference spectrum values and the compensation coefficients are computed as scalars representing magnitudes. In some aspects computation thereof forgoes computing phase angles. Thereby computations can be performed more efficiently and faster.

In some aspects, wherein the reference spectrum values and the first spectrum values represents a 1-norm, the compensation coefficients (Z) are computed by dividing values of the reference spectrum values by values of the first spectrum values.

In some aspects, wherein the reference spectrum values and the first spectrum values represents a 2-norm, the compensation coefficients are computed by dividing values of the reference spectrum values by values of the first spectrum values and computing the square root thereof.

In some aspects the compensation coefficients are transformed into filter coefficients for performing the compensation by means of a time-domain filter.

In some embodiments values of the processed audio signal and the compensation coefficients are computed for respective elements in an array of elements; and wherein the values of the compensated processed audio signal are computed, per corresponding respective elements, in accordance with a multiplication of the values of the processed audio signal and the compensation coefficients. The array of elements thus comprises a frequency-domain representation.

In some aspects the compensation coefficients are computed as magnitude values. The elements may also be denoted bins or frequency bins. In this way computations are efficient for a frequency domain representation.

In some embodiments the generating first spectrum values is in accordance with a first temporal average over first spectrum values; and/or the generating reference spectrum values is in accordance with a second temporal average over reference spectrum values, and/or the multiple second spectrum values are in accordance with a third temporal average over respective multiple second spectrum values.

In general, spectrum values may be generated by time-domain to frequency domain transformation such as an FFT transformation e.g. frame-by-frame. It is observed that significant fluctuations may occur in the spectrum values from one frame to the next.

When the spectrum values, such as the first spectrum values and the reference spectrum values are in accordance with a temporal average, fluctuations may be reduced. This provides for a more stable and effective compensation of coloration.

The first, second and/or third temporal average may be over past values of a respective signal e.g. including present values of the respective signal.

In some aspects the first, second and/or third temporal average may be computed using a moving average method also known as a FIR (Finite Impulse Response) method. Averaging may be across e.g. 5 frames or 8 frames or fewer or more frames.

In some aspects the first, second and/or third temporal average may be computed using a recursive filtering method. Recursive filtering is also known as an IIR (Infinite Impulse Response) method. An advantage of using the recursive filtering method to compute the power spectrum is that less memory is required compared to the moving average method.

Filter coefficients of the recursive filtering method or the moving average method may be determined from experimentation e.g. to improve a quality measure such as the POLQA MOS measure and/or another quality measure e.g. distortion.

In some embodiments, the first temporal average and the second temporal average are in accordance with mutually corresponding averaging properties; and/or the first temporal average and the third temporal average are in accordance with mutually corresponding averaging properties.

Thereby, computation of the plurality of compensation coefficients from the reference spectrum values and the first spectrum values can be performed more efficiently. Also, sound quality of the compensated processed signal is improved.

Mutually corresponding averaging properties may include similar or identical averaging properties. Averaging properties may include one or more of: filter coefficient values, order of an IIR filter, and order of a FIR filter. Averaging properties may also be denoted filter properties e.g. averaging filter properties or low-pass filter properties.

Thus, the first spectrum values and the reference spectrum values may be computed in accordance with the same temporal filtering. For instance, it may improve sound quality and/or reduce the effect of coloration when temporal averaging uses the same type of temporal filtering e.g. IIR or FIR filtering and/or when the temporal filtering uses the same filter coefficients for the temporal filtering. The temporal filtering may be across frames.

The first spectrum values and the reference spectrum values may be computed by the same or substantially the same type of Discrete Fast Fourier Transformation.

For instance, the spectrum values may be computed equally in accordance with a same norm, e.g. a 1-norm or a 2-norm, and/or equally in accordance with a same number of frequency bins.

In some embodiments the first spectrum values, the multiple second spectrum values, and the reference spectrum values are computed for consecutive frames of microphone signals.

Since frame-by-frame processing of audio signals is a well-established practice, the claimed method is compatible with existing processing structures and algorithms.

Generally, herein, the reference spectrum may change with the microphone signals at an update rate e.g. at a frame rate which is much lower than a sample rate. The frame rate may be e.g. about 2 ms (milliseconds), 4 ms, 8 ms, 16 ms, 32 ms or another rate which may be different from a $2^N$ ms rate. The sample rate may be in the range of 4 Khz to 196 KHz as it is known in the art. Each frame may comprise e.g. 128 samples per signal, e.g. four times 128 samples for four signals. Each frame may comprise more or less than 128 samples per signal e.g. 64 samples or 256 samples or 512 samples.

The reference spectrum may alternatively change at a rate different from the framerate. The reference spectrum may be computed at regular or irregular rates.

In some aspects the compensation coefficients are computed at an update rate which is lower than the frame rate. In some aspects the processed audio signal is compensated in accordance with compensation coefficients at an update rate which is lower than the frame rate. The update rate may be a regular or irregular rate.

A speakerphone device may comprise a loudspeaker to reproduce the far-end audio signal received e.g. in connection with a telephone call or conference call. However, it is observed that sound reproduced by the loudspeaker may degrade performance of the compensation.

In some embodiments the electronic device comprises a circuit configured to reproduce a far-end audio signal via a loudspeaker; and the method comprises:

- determining that the far-end audio signal meets a first criterion and/or fails to meet a second criterion, and in accordance therewith:
- forgo one or more of: compensating the processed audio signal, generating first spectrum values from the processed audio signal, and generating reference spectrum values from multiple second spectrum values; and
- determining that the far-end audio signal fails to meet the first criterion and/or meets the second criterion, and in accordance therewith:
- performing one or more of: compensating the processed audio signal, generating first spectrum values from the processed audio signal, and generating reference spectrum values from multiple second spectrum values.

Such a method is useful e.g. when the electronic device is configured as a speakerphone device. In particular it is observed that compensation is improved, e.g. at times right after sound has been reproduced by the loudspeaker, e.g. when a person is speaking in the surrounding room.

In accordance with the method, it is possible to avoid, at least at times, or to temporarily disable that the method performs one or more of: compensating the processed audio signal, generating first spectrum values from the processed audio signal, and generating reference spectrum values from multiple second spectrum values.

In some aspects, the method comprises determining that the far-end audio signal meets a first criterion and/or a fails to meet a second criterion, and in accordance therewith forgo one or both of: generating first spectrum values from the processed audio signal, and generating reference spectrum values from multiple second spectrum values, while performing compensating the processed audio signal.

With respect thereto, the compensation may be performed in accordance with compensation coefficients generated from most recent first spectrum values and/or most recent reference spectrum values and/or in accordance with predefined compensation coefficients.

Thereby, compensating the processed audio signal may continue while pausing or not continuing generating first spectrum values from the processed audio signal, and while pausing or not continuing generating reference spectrum values from multiple second spectrum values. Compensation may thus continue without being disturbed by an unreliable reference e.g. while the loudspeaker is reproducing sound from a far end.

The first criterion may be that a threshold magnitude and/or amplitude of the far-end audio signal is exceeded.

The method may forgo compensating for coloration or forgo changing compensating for coloration when a far-end party to a call is speaking. However, the method may operate to compensate the processed audio signal for coloration when a near-end party to the call is speaking.

The second criterion may be satisfied at times when the electronic device has completed a power-up procedure and is operative to engage in a call or is engaged in a call.

The method may forgo compensating the processed audio signal by at least temporarily, e.g. while the first criterion is met, applying compensation coefficients which are predefined e.g. static. In some aspects, the compensation coefficients which are predefined e.g. static may provide a compensation with a 'flat', e.g. neutral, or predefined frequency characteristic.

In some embodiments the first spectrum values and the reference spectrum values are computed in accordance with a predefined norm, selected from the group of: the 1-norm, the 2-norm, the 3-norm, a logarithmic norm or another predefined norm.

In some embodiments,

- the generating a processed audio signal from the plurality of microphone signals is performed at a first semiconductor portion receiving the plurality of respective microphone signals in a time-domain representation and outputting the processed audio signal in a time-domain representation; and
- at a second semiconductor portion:
- the first spectrum values are computed from the processed audio signal by a time-domain-to-frequency-domain transformation of the microphone signals; and
- the multiple second spectrum values are computed by a respective time-domain-to-frequency-domain transformation of the respective microphone signals.

This method is expedient for integration with components which do not provide an interface for accessing frequency domain representations of the microphone signals or the processed signal.

The electronic device may thus comprise the first semiconductor portion e.g. in the form of a first integrated circuit component and comprise the second semiconductor portion e.g. in the form of a second integrated circuit component.

In some embodiments the method comprises:

- communicating, in real-time, the compensated processed audio signal to one or more of:
- a loudspeaker of the electronic device, and
- a receiving device in proximity of the electronic device; and
- a far-end receiving device.

The method is able to keep updating the compensation dynamically while communicating, in real-time, the compensated processed audio signal.

Generally, herein, the method may comprise performing time-domain-to-frequency-domain transformation of one or more of: the microphone signals, the processed signal, and the compensated processed signal.

The method may comprise performing frequency-domain-to-time-domain transformation of one or more of: the compensation coefficients and the compensated processed signal.

There is also provided an electronic device, comprising:

- an array microphones with a plurality of microphones; and
- one or more signal processors, wherein the one or more signal processors are configured to perform any of the above methods.

The electronic device may be configured to perform time-domain-to-frequency-domain transformation of one or more of: the microphone signals, the processed signal, and the compensated processed signal.

The electronic device may be configured to perform frequency-domain-to-time-domain transformation of one or more of: the compensation coefficients and the compensated processed signal.

In the some embodiments the electronic device is configured as a speakerphone or a headset or a hearing instrument.

There is also provided a computer readable storage medium storing one or more programs, the one or more programs comprising instructions, which when executed by an electronic device with a signal processor cause the electronic device to perform any of the above methods.

Generally, herein, coloration, may be due to early reflections (arriving within less than 40 milliseconds of a direct signal) and leads to a subjective degradation of the voice quality.

Generally, herein, a surrounding room refers to any type of room wherein the electronic device is placed. The surrounding room may also refer to an area or a room. The surrounding room may be an open or semi-open room or an outdoor room or area.

BRIEF DESCRIPTION OF THE FIGURES

A more detailed description follows below with reference to the drawing, in which.

DETAILED DESCRIPTION

Figure 1:
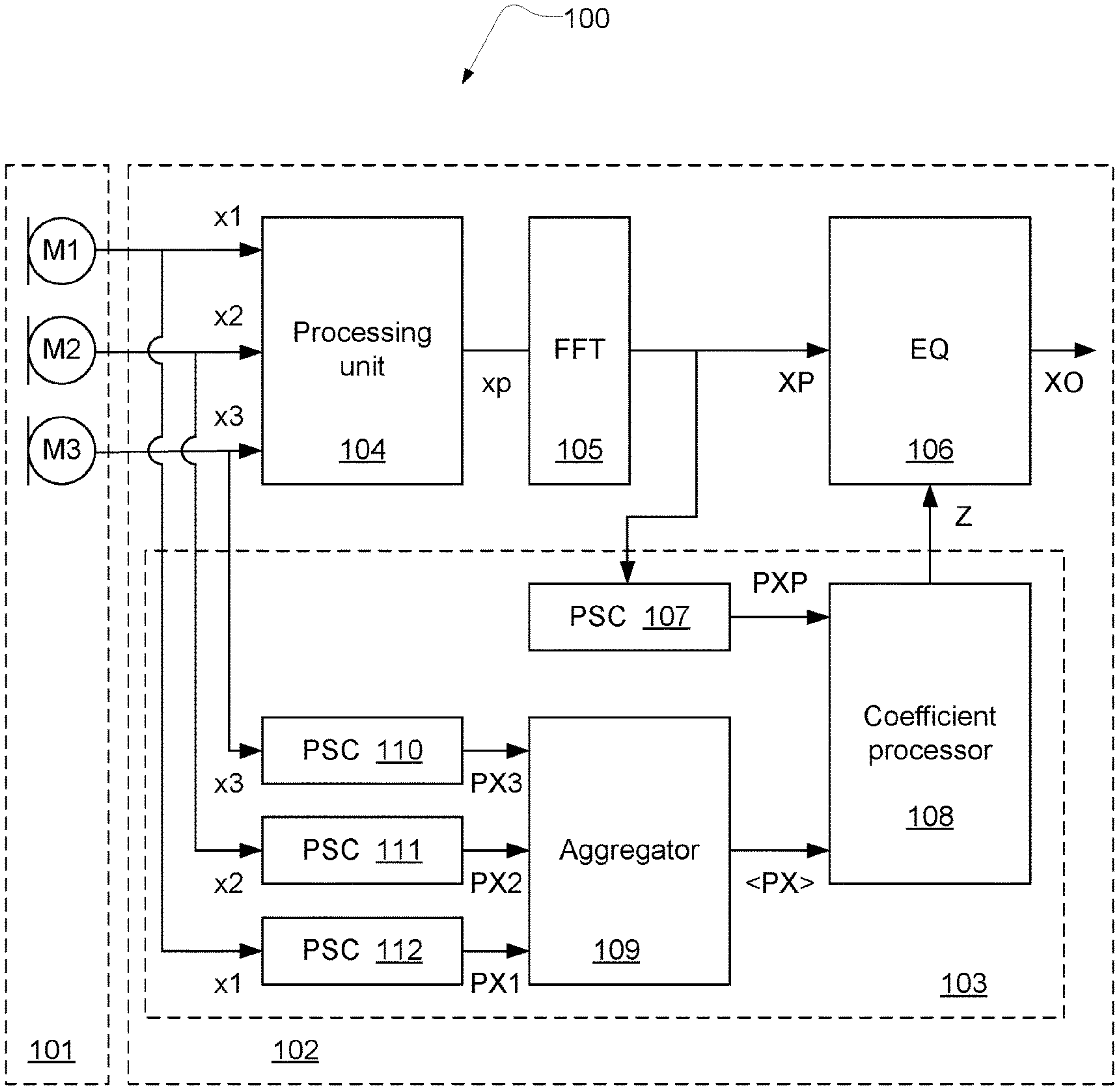
FIG. 1 shows a block diagram of an electronic device having an array of microphones and a processor.

FIG. 1 shows a block diagram of an electronic device having an array of microphones and a processor. The processor 102 may comprise a digital signal processor e.g. programmable signal processor.

The electronic device 100 comprises an array of microphones 101 configured to output a plurality of microphone signals and a processor 102. The array of microphones 101 comprises a plurality of microphones M1, M2 and M3. The array may comprise additional microphones. For instance, the array of microphones may comprise four, five, six, seven or eight microphones.

The microphones may be digital microphones or analogue microphones. In case of analogue microphones analogue-to-digital conversion is required as it is known in the art.

The processor 102 comprises a processing unit 104, such as a multi-microphone processing unit, an equalizer 106 and a compensator 103. In this embodiment, the processing unit receives digital time-domain signals x1, x2, and x3 and outputs a digital time-domain processed signal, xp. The digital time-domain signals x1, x2, and x3 are processed e.g. frame-by-frame as it is known in the art.

In this embodiment an FFT (Fast Fourier Transformation) transformer 105 transforms the time-domain signal, xp, to a frequency domain signal, XP. In other embodiments the processing unit receives digital frequency-domain signals and outputs a digital frequency-domain processed signal, XP, in which case the FFT transformer 105 can be dispensed with.

The processing unit 104 is configured to generate the processed audio signal, xp, from the plurality of microphone signals using one or both of beamforming and deconvolution. The processing unit 104 may be configured to generate the processed audio signal, xp, from the plurality of microphone signals using processing methods (e.g. denoted multi-microphone enhancement methods) such as, but not limited to, beamforming and/or deconvolution and/or noise suppression and/or time-varying (e.g. adaptive) filtering to generate a processed audio signal from multiple microphones.

The equalizer 106 is configured to generate a compensated processed audio signal, XO, by compensating the processed audio signal, XP, in accordance with compensation coefficients, Z. The compensation coefficients are computed by a coefficient processor 108. In this embodiment the equalizer is implemented in the frequency-domain, but in case the processing unit outputs a time-domain signal or for other reasons it may be more expedient if the equalizer is a time-domain filter filtering the processed signal in accordance with the coefficients.

The compensator 103 receives the microphone signal x1, x2 and x3 in a time-domain representation; the signal XP as provided by the FFT transformer 105 and outputs the coefficients, Z.

The compensator 103 is configured with a power spectrum calculator 107 to generate first spectrum values, PXP, from the processed audio signal XP, as output from the FFT transformer. The power spectrum calculator 107 may compute a power spectrum as known in the art.

The power spectrum calculator 107 may compute the first spectrum values, PXP, including computing a temporal average of magnitude values (e.g. unsigned values) or computing an average of squared values per frequency bin over multiple frames. That is, a temporal average of magnitude values of spectrum values or squared values of spectrum values is computed.

The power spectrum calculator 107 may compute the first spectrum values using a moving average method also known as a FIR (Finite Impulse Response) method. Averaging may be across e.g. 5 frames or 8 frames or fewer or more frames.

Alternatively, the power spectrum calculator 107 may compute the first spectrum values including recursive filtering, e.g. first order recursive filtering or second order recursive filtering. Recursive filtering is also known as an IIR (Infinite Impulse Response) method. An advantage of using the recursive filtering method to compute the power spectrum is that less memory is required compared to the moving average method. Filter coefficients of the recursive filtering may be determined from experimentation e.g. to improve a quality measure such as the POLQA MOS measure.

Generally, the first spectrum values, PXP, may be computed, from a frequency domain representation, e.g. obtained by FFT transformer 105, by performing the temporal averaging on, e.g., magnitude values or magnitude-squared values from the FFT transformer 105.

Generally herein, the first spectrum values and the second spectrum values mentioned below, may be designated as a 'power spectrum' to designate that the first spectrum values and the second spectrum values are computed using temporal averaging of spectrum values e.g. as described above, albeit not necessarily strictly being a measure of 'power'. The first spectrum values and the second spectrum values are more slowly varying over time than the spectrum values from the FFT transformer 105 due to the temporal averaging.

The first spectrum values and the second spectrum values may be represented by e.g. a 1-norm or 2-norm of the temporally averaged spectrum values.

The compensator 103 may be configured with a bank of power spectrum calculators 110, 111, 112 configured to receive the microphone signals x1, x2 and x3 and to output respective second spectrum values PX1, PX2, and PX3. The power spectrum calculators 110, 111, 112 may each perform an FFT transformation and compute the second spectrum values. In some embodiments the power spectrum calculators 110, 111, 112 may each perform an FFT transformation and compute the second spectrum values including computing time averaging as described above e.g. using the moving average (FIR) method or the recursive (IIR) method.

An aggregator 109 receives the second spectrum values PX1, PX2, and PX3 and generates reference spectrum values <PX> from the second spectrum values generated for each of at least two of the microphone signals in the plurality of microphone signals. The pointed parenthesis in <PX> indicates that the reference spectrum values <PX> are based on an average or median across PX1, PX2, and PX3 e.g. per frequency bin. Thus, whereas the power spectrum calculators 110, 111, 112 may each perform temporal averaging, the aggregator 109 computes an average or median across PX1, PX2, and PX3. Therefore, the reference spectrum values <PX> may have the same dimensionality (e.g. an array of 129 elements e.g. for an FFT with N=256) as each of the second spectrum values PX1, PX2, and PX3.

The aggregator may compute the average (mean) or a median value across the second spectrum values PX1, PX2, and PX3 and per frequency bin. The reference spectrum values may be generated in another way e.g. using a weighted average of the second spectrum values PX1, PX2 and PX3. The second spectrum values may be weighted by predetermined weights in accordance with the spatial and/or acoustic arrangement of the respective microphones. In some embodiments, some microphone signals from the microphones in the array of microphones are excluded from being included in the reference spectrum values.

The coefficient processor 108 receives the first spectrum values PXP and the reference spectrum values <PX> e.g. represented in respective arrays with a number of elements corresponding to frequency bins. The coefficient processor 108 may compute coefficients element-by-element to output a corresponding array of coefficients. The coefficients may be subject to normalization or other processing e.g. to smooth the coefficients across frequency bins or to enhance the coefficients at predefined frequency bins.

The equalizer receives the coefficients and manipulates the processed signal, XP, in accordance with the coefficients, Z.

The power spectrum calculator 107 and power spectrum calculators 110, 111, 112 may alternatively be configured to compute a predefined norm e.g. selected from the group of: the 1-norm, the 2-norm, the 3-norm, a logarithmic norm or another predefined norm.

As an example:

Consider the processed signal, XP, as a row vector with vector elements representing a complex number, and the coefficients, Z, as a row vector with vector elements representing a scalar or a complex number, the compensated processed signal, XO, may then be computed by the equalizer by element-wise operations e.g. comprising element-wise multiplication or element wise division.

Further, consider the second spectrum values PX1, PX2, and PX3 as row vectors in a matrix with vector elements representing scalar numbers, aggregation may then comprise one or both of averaging or computing a median column-wise in the matrix to provide the reference spectrum values <PX> also as row vector with the result of the average or median computation.

Figure 2:
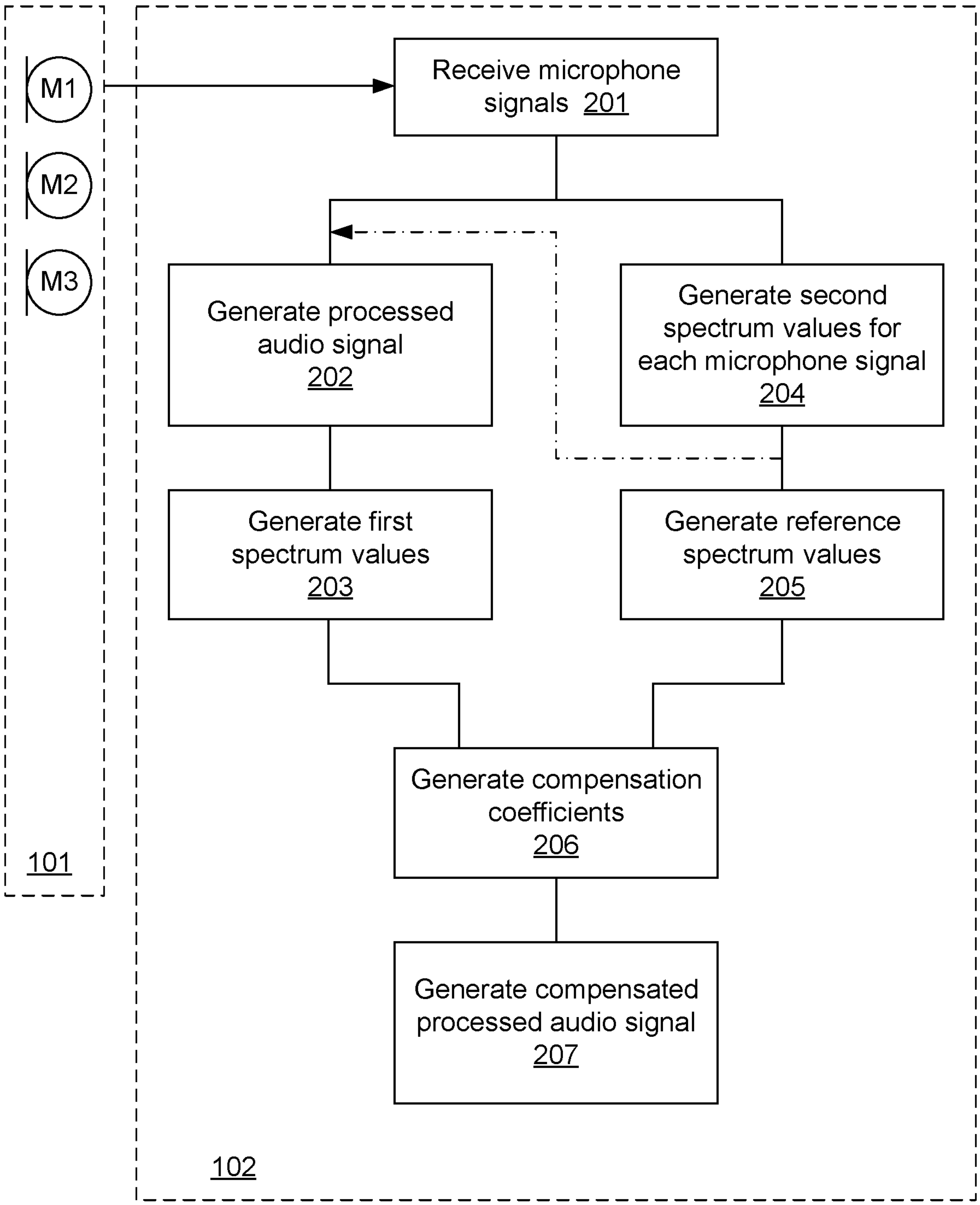
FIG. 2 shows a flowchart for a method at an electronic device having an array of microphones and a processor.

FIG. 2 shows a flowchart for a method at an electronic device having an array of microphones and a processor. The method may be performed at an electronic device having an array of microphones 101 and a processor 102. The processor may be configured by one or both of hardware and software to perform the method.

The method comprises at step 201 receiving a plurality of microphone signals from the array of microphones and at step 202 generating a processed signal from the plurality of microphone signals. In readiness of step 202 or concurrently therewith, the method comprises at step 204 generating second spectrum values which are generated from each of at least two of the microphone signals in the plurality of microphone signals.

Subsequent to step 202, the method comprises step 203 generating first spectrum values from the processed audio signal.

Subsequent to step 204, the method comprises step 205 generating reference spectrum values from multiple second spectrum values.

Following step 203 and step 205, the method comprises generating the plurality of compensation coefficients from the reference spectrum values and the first spectrum values. The method then proceeds to step 207 to generate a compensated processed signal by compensating the processed audio signal in accordance with a plurality of compensation coefficients. The compensated processed signal may be in accordance with a frequency-domain representation and the method may comprise transforming the frequency-domain representation to a time-domain representation.

In some embodiments of the method, microphone signals are provided in consecutive frames and the method may be run for each frame. More detailed aspects of the method are set out in connection with the electronic device as described herein.

Figure 3:
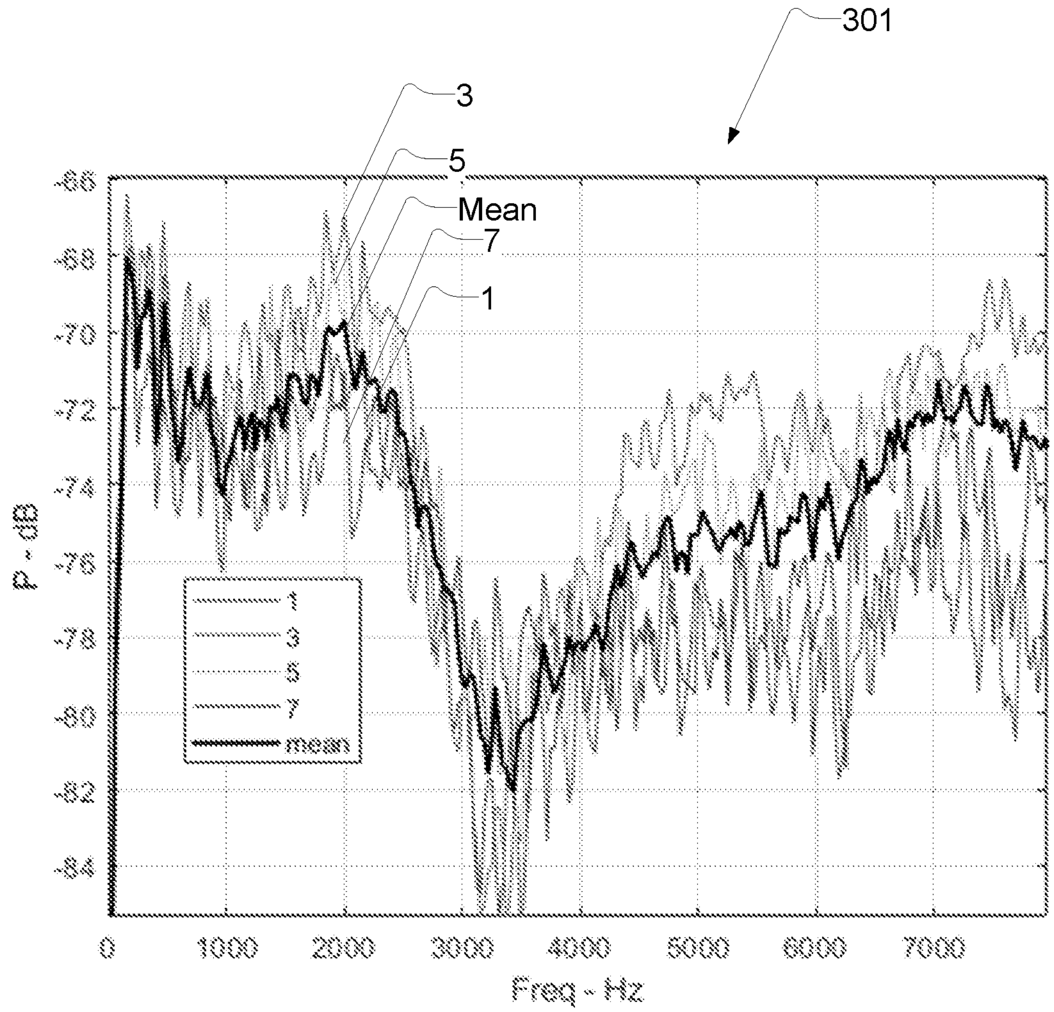
FIG. 3 shows magnitude spectrum values for microphone signals.

FIG. 3 shows magnitude spectrum values for microphone signals. The magnitude spectrum values are shown for four microphone signals "1", "3", "5" and "7" which are microphone signals from respective microphones in a microphone array configured with eight microphones of a speakerphone. The speakerphone was operating on a table in a small room. The magnitude spectrum values are shown in power levels ranging from about −84 dB relative to about −66 dB relative in a frequency band shown from 0 Hz to about 8000 Hz.

It can be seen that the mean spectrum values "mean" represents that undesired coloration due to early reflections from the room and its equipment is smaller when aggregating across spectrum values of the microphone signals. The mean spectrum values "mean" represents thus a robust reference for performing the compensation described herein.

Figure 4:
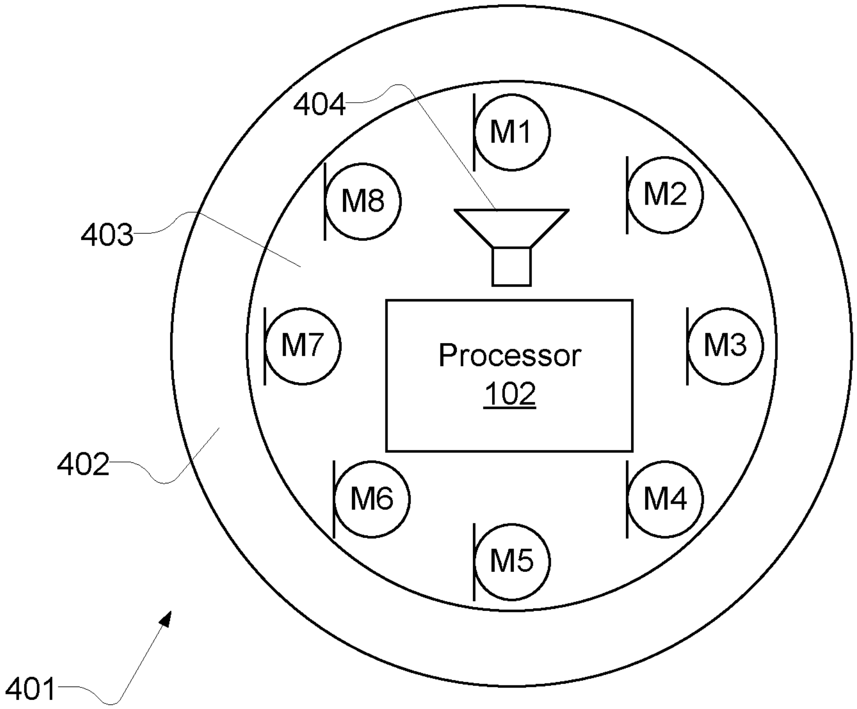
FIG. 4 shows an electronic device configured as a speakerphone having an array of microphones and a processor.

FIG. 4 shows an electronic device configured as a speakerphone having an array of microphones and a processor. The speakerphone 401 has an array of microphones with microphones M1, M2, M3, M4, M5, M6, M7, and M8 and a processor 102.

The speakerphone 401 may be configured with a rim portion 402 e.g. with touch-sensitive buttons for operating the speakerphone such as for controlling a speaker volume, answering an incoming call, ending a call etc. as it is known in the art.

The speakerphone 401 may be configured with a central portion 403 e.g. with openings (not shown) for the microphones to be covered by the central portion while being able to receive an acoustic signal from the room in which the speakerphone is placed. The speakerphone 401 may also be configured with a loudspeaker 404 connected to the processor 102 e.g. to reproduce the sound communicated from a far-end party to a call or to reproduce music a ring tone etc.

The array of microphones and the processor 102 may be configured as described in more detail herein.

Figure 5:
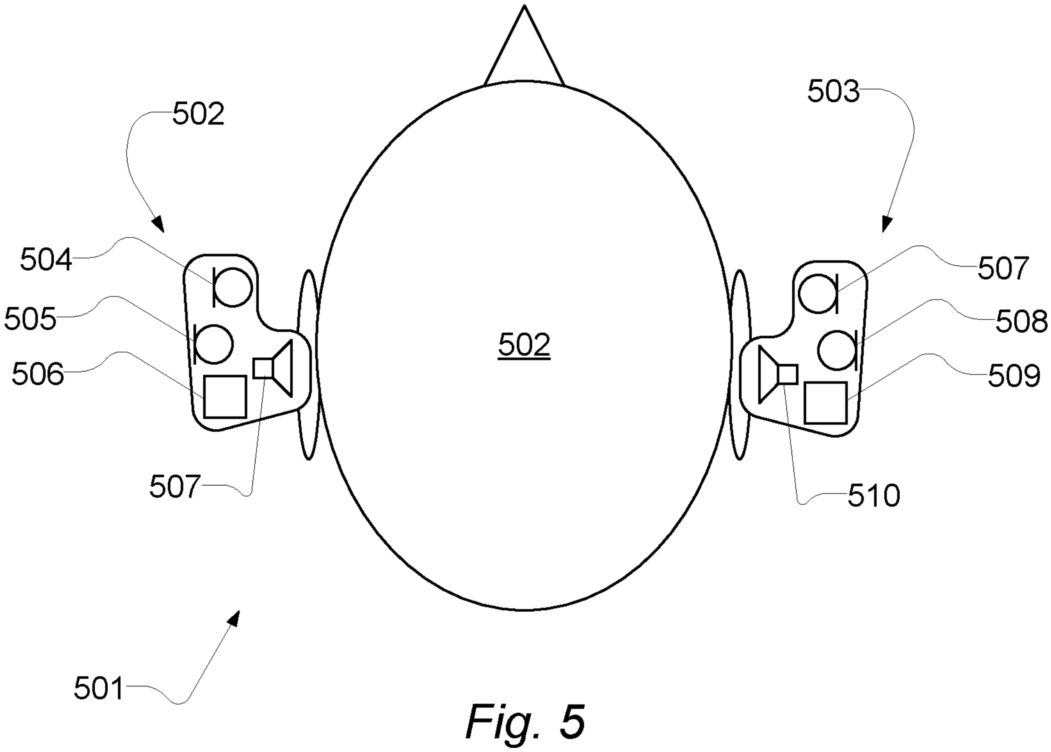
FIG. 5 shows an electronic device configured as a headset or a hearing instrument having an array of microphones and a processor.

FIG. 5 shows an electronic device configured as a headset or a hearing instrument having an array of microphones and a processor. Albeit a headset and a hearing instrument may or may not be configured very differently, the configuration shown may be used in both an embodiment of a headset and a hearing instrument.

Considering the electronic device as headset, there is shown a top-view of a person's head 502 in connection with a headset left device 502 and a headset right device 503. The headset left device 502 and the headset right device 503 may be in wired or wireless communication as it is known in the art.

The headset left device 502 comprises microphones 504, 505, a miniature loudspeaker 507 and a processor 506. Correspondingly, the headset right device 503 comprises microphones 507, 508, a miniature loudspeaker 510 and a processor 509.

The microphones 504, 505 may be arranged in an array of microphones comprising further microphones e.g. one, two, or three further microphones. Correspondingly, microphones 507, 508 may be arranged in an array of microphones comprising further microphones e.g. one, two, or three further microphones The processors 506 and 509 may each be configured as described in connection with processor 102. Alternatively, one of the processors, e.g. processor 506, may receive the microphone signals from all of the microphones 504, 505, 507, and 508 and perform at least the step of computing coefficients.

Figure 6:
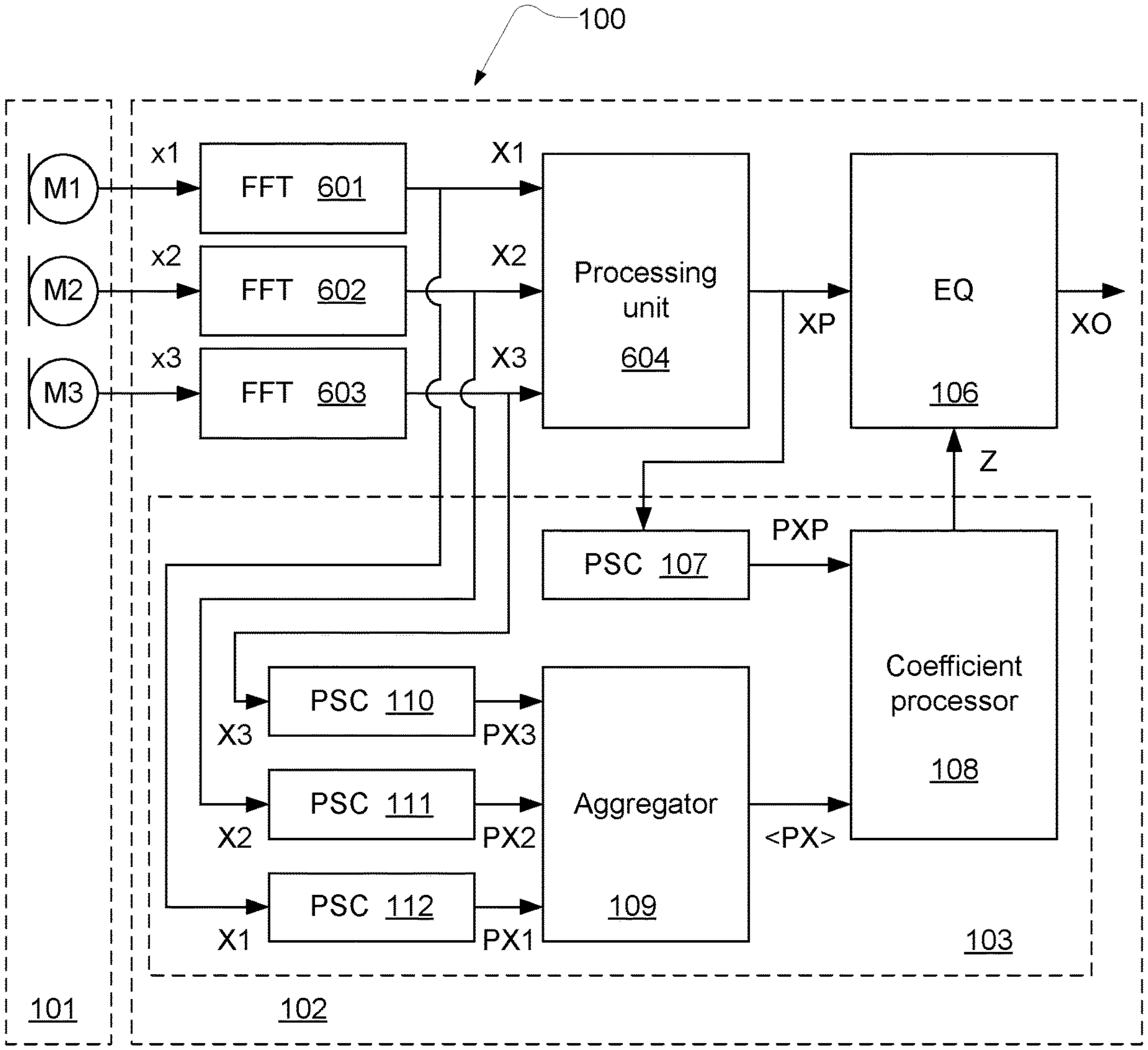
FIG. 6 shows a block diagram of the electronic device, wherein the processing unit operates on frequency domain signals.

FIG. 6 shows a block diagram of the electronic device, wherein the processing unit operates on frequency domain signals. Generally, FIG. 6 corresponds closely to FIG. 1 and many reference numerals are the same.

In particular, in accordance with FIG. 6, the processing unit 604 operates on frequency domain signals, X1, X2 and X3 corresponding to respective transformations of the time domain signals, x1, x2 and x3, respectively. The processing unit 604 outputs a frequency domain signal XP, which is processed by equalizer 106 as described above.

Rather than performing time-domain to frequency-domain transformations, the bank of power spectrum calculators 110, 111, 112 are here configured to receive the microphone signals X1, X2 and X3 in the frequency-domain, and to output respective second spectrum values PX1, PX2, and PX3. The power spectrum calculators 110, 111, 112 may each compute the second spectrum values as described above e.g. using the moving average (FIR) method or the recursive (IIR) method.

Figure 7:
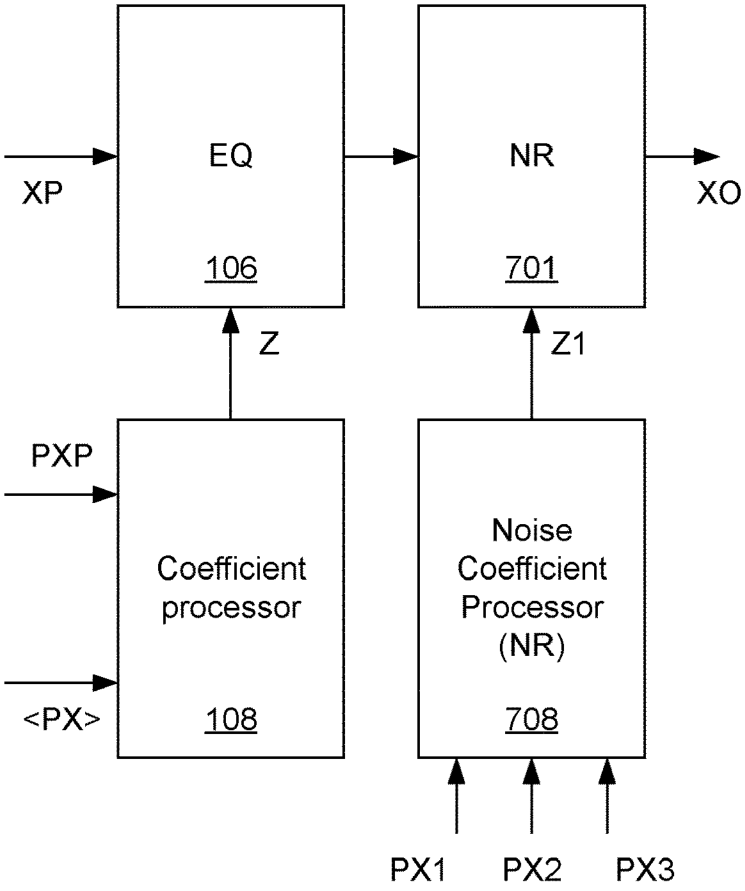
FIG. 7 shows a block diagram of an equalizer and a noise reduction unit.

FIG. 7 shows a block diagram of an equalizer and a noise reduction unit. The equalizer may be coupled to a coefficient processor 108 as described in connection with in FIG. 1 or 6. As shown, output from the equalizer 106 is input to a noise reduction unit 701 to provide the output signal, XO, wherein noise is reduced. The noise reduction unit 701, may receive a set of coefficients, Z1, which are computed by a noise reduction coefficient processor 708. Thus, generating the compensated processed signal (XO) includes noise reduction, which is performed by the noise reduction unit. The noise reduction serves to reduce noise, e.g. signals which are not detected as a voice activity signal. In the frequency domain, a voice activity detector may be used to detect time-frequency bins, which relate to voice activity and, hence, which (other) time-frequency bins are more likely noise. The noise reduction may be non-linear, whereas equalization may be linear.

Thus, first coefficients, Z, are determined for equalization and second coefficients, Z1, are determined for noise reduction. In some aspects the equalization is performed by a first filter and the noise reduction is performed by a second filter. As shown, the first filter and the second filter may be coupled in series. As mentioned herein, the noise reduction may be performed by means of a post-filter e.g. a Wiener post-filter, e.g. a so-called Zelinski post-filter or e.g. a post-filter as described in "Microphone Array Post-Filter Based on Noise Field Coherence", by Iain A. McCowan, IEEE Transactions on Speech and Audio Processing, vol. 11, no. 6, November 2003.

Figure 8:
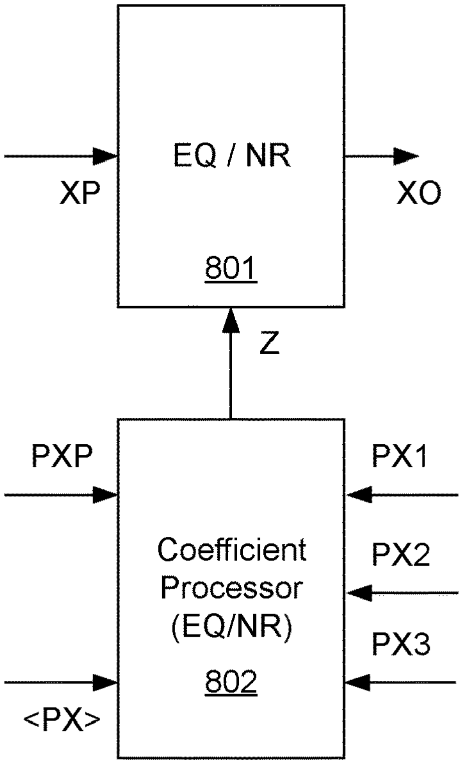
FIG. 8 shows a block diagram of a combined equalizer and noise reduction unit.

FIG. 8 shows a block diagram of a combined equalizer and noise reduction unit. The combined equalizer and noise reduction unit, 801, receives the set of coefficients, Z. In this embodiment, the above-mentioned first coefficients and the second coefficients are combined, e.g. including multiplication, into the above-mentioned plurality of compensation coefficients, Z. Thereby equalization and noise reduction may be performed by a single unit 801 e.g. a filter.

There is also provided an apparatus comprising:

an array of microphones (101) configured to output a plurality of microphone signals; and a processor (102) configured with:

a processing unit (104) configured to generate a processed audio signal (xp) from the plurality of microphone signals using one or both of beamforming and deconvolution;

an equalizer (106) generating a compensated processed audio signal by compensating the processed audio signal in accordance with compensation coefficients (Z); and a compensator (103), configured to generate first spectrum values from the processed audio signal;

generating reference spectrum values from second spectrum values generated for each of at least two of the microphone signals in the plurality of microphone signals; and generating the compensation coefficients from the reference spectrum values and the first spectrum values.

Embodiments thereof are described with respect to the method described herein comprising all embodiments and aspects of the method.

Compensation as set out herein may significantly reduce the undesired effect of coloration caused by the generation of the processed audio signal from the plurality of microphone signals using one or both of beamforming and deconvolution.

In some embodiments, in a multi-microphone speakerphone, the method improved sound quality of a compensated processed signal from 2.7 POLQA MOS (without using the method described herein) to 3.0 POLQA MOS when the multi-microphone speakerphone was operating on a table in a small room.

The invention claimed is:

1. A method comprising, at an electronic device having an array of microphones and a processor:

receiving a plurality of microphone signals from the array of microphones;

generating a processed audio signal from the plurality of microphone signals;

compensating for coloration in the processed audio signal in accordance with a plurality of compensation coefficients by frequency response equalizing the processed audio signal, comprising:

generating first spectrum values from the processed audio signal;

generating multiple second spectrum values from each of at least two but less than a full value of the plurality of microphone signals;

generating reference spectrum values from the multiple second spectrum values; and generating the plurality of compensation coefficients from the reference spectrum values and the first spectrum values, wherein the the compensating reduces a predefined difference measure between a predefined norm of spectrum values of the compensated processed audio signal and the reference spectrum values.

2. A method according to claim 1, wherein the multiple second spectrum values are each represented in an array of values; and wherein the reference spectrum values are generated by computing an average or a median value across, respectively, at least two or at least three of the multiple second spectrum values.

3. A method according to claim 1, wherein the compensating includes noise reduction.

4. A method according to claim 3, wherein the generating of a processed audio signal from the plurality of microphone signals includes one or more of spatial filtering, beamforming, and deconvolution.

5. A method according to claim 4, wherein the first spectrum values and the reference spectrum values are computed for respective elements in an array of elements; and wherein the compensation coefficients are computed, per corresponding respective element, in accordance with a ratio between a value of the reference spectrum values and a value of the first spectrum values.

6. A method according to claim 5, wherein values of the processed audio signal and the compensation coefficients are computed for respective elements in an array of elements; and wherein the values of the compensated processed audio signal are computed, per corresponding respective elements, in accordance with a multiplication of the values of the processed audio signal and the compensation coefficients.

7. A method according to claim 6, wherein the generating reference spectrum values is in accordance with a second temporal average over reference spectrum values, and/or the multiple second spectrum values are in accordance with a third temporal average over respective multiple second spectrum values.

8. A method according to claim 6, wherein the generating first spectrum values is in accordance with a first temporal average over first spectrum values.

9. A method according to claim 8, wherein:

the first temporal average and the second temporal average are in accordance with mutually corresponding averaging properties; and/or the first temporal average and the third temporal average are in accordance with mutually corresponding averaging properties.

10. A method according to claim 9, wherein the first spectrum values, the multiple second spectrum values, and the reference spectrum values are computed for consecutive frames of microphone signals.

11. A method according to claim 10, wherein the electronic device comprises a circuit configured to reproduce a far-end audio signal via a loudspeaker, the method comprising:

determining that the far-end audio signal meets a first criterion and/or fails to meet a second criterion, and in accordance therewith forgo one or more of:

compensating for coloration in the processed audio signal, generating first spectrum values from the processed audio signal, and generating reference spectrum values from multiple second spectrum values; and determining that the far-end audio signal fails to meet the first criterion and/or meets the second criterion, and in accordance therewith:

performing one or more of:

compensating for coloration in the processed audio signal, generating first spectrum values from the processed audio signal, and generating reference spectrum values from multiple second spectrum values.

12. A method according to claim 11, wherein the first spectrum values and the reference spectrum values are computed in accordance with a predefined norm, selected from the group of: the 1-norm, the 2-norm, the 3-norm, a logarithmic norm or another predefined norm.

13. A method according to claim 12, wherein the generating of a processed audio signal from the plurality of microphone signals is performed at a first semiconductor portion receiving the plurality of respective microphone signals in a time-domain representation and outputting the processed audio signal in a time-domain representation; and at a second semiconductor portion:

the first spectrum values are computed from the processed audio signal by a time-domain-to-frequency-domain transformation of the microphone signals; and the multiple second spectrum values are computed by a respective time-domain-to-frequency-domain transformation of the respective microphone signals.

14. A method according to claim 13, further comprising:

communicating, in real-time, the compensated processed audio signal to one or more of a loudspeaker of the electronic device, a receiving device in proximity of the electronic device, and a far-end receiving device.

15. A method according to claim 8, wherein, further, the generating reference spectrum values is in accordance with a second temporal average over reference spectrum values, and/or the multiple second spectrum values are in accordance with a third temporal average over respective multiple second spectrum values.

16. An electronic device, comprising:

an array of microphones with a plurality of microphones; and one or more signal processors, wherein the one or more signal processors are configured to perform any of the method of claim 1.

17. An electronic device according to claim 16, configured as a speakerphone or a headset or a hearing instrument.

* * * * *